Nov. 17, 1964         S. GRAYDON, JR         3,157,803
SPLIT-ARMATURE ROTARY SOLENOID
Filed June 28, 1961                          2 Sheets-Sheet 1
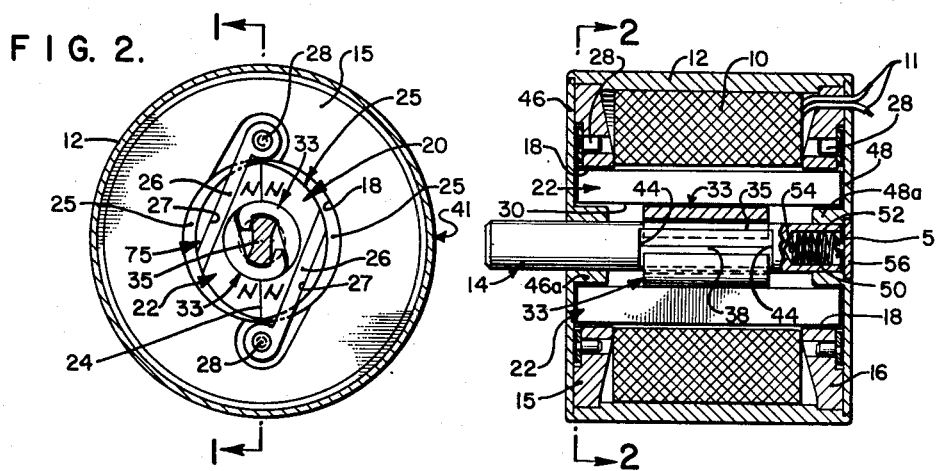
STERLING GRAYDON, JR
*INVENTOR.*
BY
ATTORNEY Nov. 17, 1964  S. GRAYDON, JR  3,157,803
SPLIT-ARMATURE ROTARY SOLENOID
Filed June 28, 1961  2 Sheets-Sheet 2
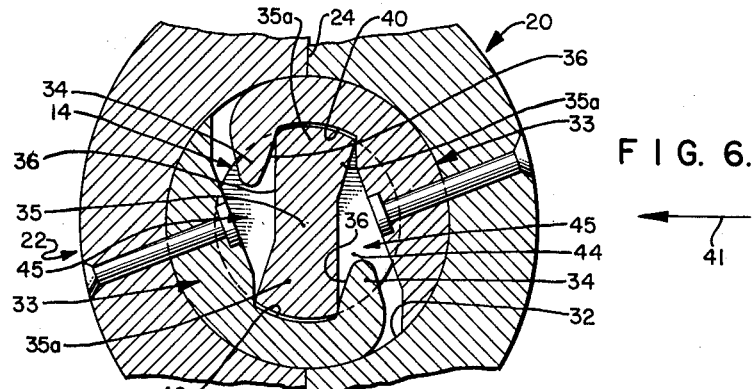
FIG. 6.
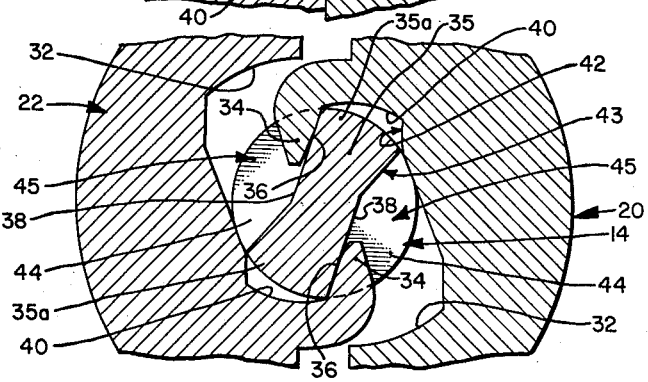
FIG. 7.
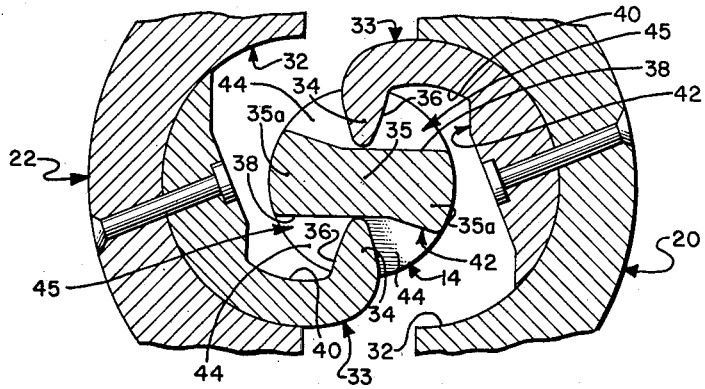
FIG. 8.
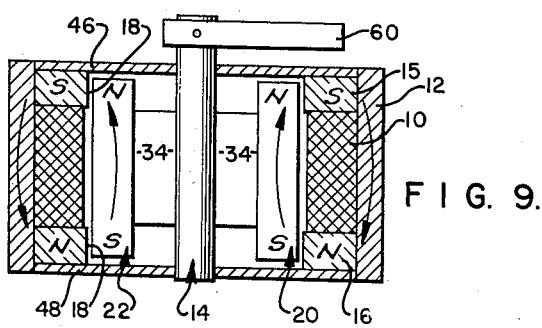
FIG. 9.
STERLING GRAYDON, JR.
INVENTOR.
ATTORNEY

United States Patent Office 3,157,803
Patented Nov. 17, 1964

3,157,803
SPLIT-ARMATURE ROTARY SOLENOID
Sterling Graydon, Jr., 2901 Via La Selva,
Palos Verdes Estates, Calif.
Filed June 28, 1961, Ser. No. 120,222
13 Claims. (Cl. 310—24)

This invention relates to solenoids, and more particularly to a rotary solenoid structure wherein magnetically operated devices are employed to convert lineal or radial motion to rotary motion of an output shaft upon energization magnetically.

A principal object of this invention is to provide a solenoid structure which simultaneously relies upon both repulsion and attraction in effecting movement of parts in lineal directions, whereby to transmit rotary movement to a shaft from which mechanical energy may be derived.

A further object of the invention is to provide in a rotary solenoid two armatures, which are in the nature of a split armature, wherein each of the split armature parts is allowed to swing or rotate on an independent shaft center or pivot center.

A still further object of the invention is to produce a rotary solenoid structure wherein a rotatable shaft is disposed with its axis parallel to the generated magnetic fields.

An additional object is to produce a rotary solenoid structure provided with a novel arrangement of closed magnetic paths when energized in order to develop high efficiency.

An additional object of the invention is to produce a rotary solenoid having a driven shaft rotated by magnetic influences, and wherein the shaft is disposed axially within a solenoid coil and energized armature parts and extends outside and beyond such coil and parts into position for rotary actuation of control mechanism or the like.

It is a still further object of the invention to employ in a rotary solenoid an output shaft which is not a part of the magnetic armature mechanism and which is rotated to provide mechanical power output.

A still further object of the invention is to produce a rotary solenoid which, upon energization, operates first by repulsion and then by attraction, and yet employs a minimum air gap.

Other objects are to provide a structure whch will resist lateral shock or vibration, whether energized or de-energized; to make impossible rotation of the output shaft due to lateral shock; to prevent linear motion of the output shaft when in rotation; and to provide an improved solenoid structure which is guarded against moisture, dust and the like.

Further objects of the invention and various features of construction thereof will become apparent to those skilled in the art upon reference to the accompanying drawings and the following specification wherein one embodiment is disclosed which presently is deemed to represent the best mode of practicing the invention.

In the drawings:

FIG. 1 is a longitudinal sectional view taken substantially along the axis of the power output shaft as indicated by the line 1—1 of FIG. 2;

FIG. 2 is a view taken substantially on the line 2—2 of FIG. 1, with the respective end bearing plate removed, and showing the adjacent frame ring, the ends of the split armature pieces hinged in the frame ring, and also showing the driven shaft in cross-section at the middle of its length and engaged with fingers or dogs which cause it to rotate, the split armatures, shaft and dogs being in de-energized positions;

FIG. 3 is a view similar to that of FIG. 2 showing the parts in energized or operated positions;

FIG. 4 is an exploded view in perspective showing the moving parts of FIGS. 1, 2 and 3, and the end bearing plates for the shaft;

FIG. 4A is a perspective view of one of the dogs or fingers removed from its split armature piece;

FIG. 5 is a perspective view in longitudinal section showing half of the outer case, the coil and the frame rings at the two ends of the case;

FIG. 6 is a fragmentary transverse section through the middle portion of the shaft and its actuating parts, these parts being shown in their de-energized or restored position and being shown on a much enlarged scale over that of FIGS. 2 and 3;

FIG. 7 is a view similar to that of FIG. 6 and showing the moving parts approaching the half-way point in their movement, such initial movement being due to repulsion between poles of the armature parts;

FIG. 8 is a view similar to that of FIG. 6 and 7, and showing the parts at the limit of their movement under energization, the additional movement represented by this figure being due to attraction between respective poles of the armatures and the casing; and FIG. 9 is a diagrammatic indication of the pole relationships and magnetic fluxes at a given instant.

As illustrated, the rotary solenoid of this improvement includes a wound copper-wire magnetizing coil 10 having terminals or leads 11 for receiving electric current. The coil 10 and its leads are appropriately insulated with heat-resistant material such as a heat-resistant epoxy resin, heat-resistant tape, and the like. The coil 10 is snugly received in a magnetic soft iron cylindrical casing or housing 12 which axially receives a non-magnetic power shaft or driven shaft 14 when in fully assembled relation. Press fitted into the opposite ends of the case 12 are a frame ring 15, conveniently termed a front frame ring, and a frame ring 16 which is conveniently termed a rear frame ring. These rings in effect constitute ends of the casing 12. Each of these frame rings 15 and 16, which are composed of magnetizable material, is centrally provided with a circular opening 18. These openings 18 receive the opposite ends of two substantially identical armatures 20 and 22, each of which is slightly less than a semi-cylinder, these armatures 20 and 22 thus being in the nature of split armatures which are axially divided along a separation face or plane 24, as indicated in FIGS. 2 and 6. For best effects, the outer curved surface of each of the armatures 20 and 22 is formed on the same arc as that of openings 18. If the openings 18 are truly circular, then the external curvatures of the armatures 20 and 22 are produced as arcs of the same circle. In any event, when the armatures 20 and 22 are drawn together or collapsed along the separation plane 24, as indicated in FIG. 2, they leave slight but distinct small crescent-shaped air gaps between them and the walls of the respective openings 18. Such air gaps are indicated at 25. These air gaps 25 permit the armatures 20 and 22 to swing between their restored, that is de-energized or collapsed, positions illustrated in FIG. 2 and their operated, or energized, that is, expanded, positions, as seen in FIG. 3 which is also the relationship of FIG. 8. When the armatures 20 and 22 are in these laterally operated positions, their outer ends engage the walls of the openings 18, and their portions lying opposite the magnetizing coil 10 are desirably slightly spaced from the inner cylindrical wall of such coil 10. The armatures 20 and 22 are energized by flow of current in coil 10 and are de-energized by cessation of flow of such current.

To provide for the indicated movement of the armatures 20 and 22 toward and from each other in a controlled fashion, their opposite ends are hingedly or slidably connected to the respective frame rings or mounting rings 15 and 16. This mounting is shown as being effected through the means of non-magnetizable hinge arms 26 which are respectively fitted into corresponding grooves 27 in the ends of the armatures. Each arm 26 is hingedly or pivotally mounted on the outer face of the respective frame ring 15 or 16 by a pivot pin 28. By such hinging means, the movements of the armatures 20 and 22 between their operated and restored positions are accurately guided and controlled.

The armatures 20 and 22 when in their restored or de-energized positions of FIGS. 2 and 6 are provided with axial bores in opposite end bearing portions 30 thereof (FIG. 1) adjacent their outer extremities. These bearing portions 30 accommodate the adjacent end portions of the driven shaft 14. The bores, which actually are of semi-cylindrical configuration in each end of each armature 20 and 22, are formed when the armatures 20 and 22 are in contacting position as seen in FIG. 2. The intermediate portion of each armature 20 and 22 between the bearings 30 also is formed with an elongated bore 32 (FIGS. 6, 7 and 8), similarly of semi-cylindrical form in each armature, but of greater over-all diameter than that of the shaft 14 and the bearings 30, whereby each semi-cylindrical portion of such bore may receive an actuating dog 33 of curved form whose outwardly facing wall is formed on the arc of the same circle as the respective bore 32. The diameter of the bore 32 is thus greater than the diameter of the driven shaft 14.

Each of the dogs 33 is provided with an overhanging finger 34 which engages behind a portion 35 of the shaft 14, which portion 35 is flattened for such engagement of the two fingers 34 of the two dogs 33. This flattened portion 35 has its outward edges disposed on the circumference of the cylindrical portion of the shaft 14, the width of the portion 35 therefore being equal to the diameter of the shaft 14. While it is desirable from some manufacturing standpoints to form the dogs 33 and their fingers 34 as separate elements which are press fitted or pinned in the circular bore portions 32, as illustrated in most of the figures, it nevertheless is satisfactory for many purposes that the overhanging fingers 34 and the body portions 33 of the dogs be integral with the respective armatures 20 and 22 as indicated in FIGURE 7. In such instances the walls indicated at 32 merely are short arcuate partially cylindrical surfaces rather than substantially semi-cylindrical surfaces 32 represented in the other figures as receiving the dogs 33. Apart from this variation, this portion of the structure may be described as though separate dogs 33 with their fingers 34 are used and fixed in the bore portions 32. Where the fingers, or teeth, 34 are integral with the armatures 20 and 22, they are of course formed of the same soft magnetic iron as the armatures. When the dogs 33 are separately formed they may be of either magnetic or non-magnetic material.

The faces of the wing portions 35a of the flattened section 35 of the shaft 14 at the loci of the teeth or fingers 34 are engaged adjacent face portions 36 thereof so that, as the armatures 20 and 22 are moved radially outward under magnetic influences, the faces 36 of the fingers 34 engage adjacent flat surfaces 38 of the shaft wing portions 35a to cause the latter to rotate and thereby rotate the main shaft 14. To effect this action the leading faces 36 of the teeth or fingers 34 and the flattened portions of the shaft 35 may be flat, or they may be involute, or otherwise shaped as most suitable, but in any event the faces 36 of the fingers and the faces 38 of the shaft wing portions are so related that at the beginning of the movement of a finger 34, its strongest pull is at the outer edge of the respective shaft surface 38. As movement continues and the shaft is rotated, the outer end of each tooth or finger 34 gradually approaches the surface 38 so that it moves from the position of FIG. 6 to the position of FIG. 7 where the pull is weaker. At the extreme of the rotary movement, as indicated in FIG. 8, the end of each tooth 34 (which desirably is somewhat rounded as shown) engages adjacent the middle of the respective wall 38 of the corresponding wing 35a of the flattened shaft portion 35 where the pull is weakest and substantially nonexistent. However, the shaft is held securely until de-energization of the coil 10 and of the energized parts is effected.

Each end portion or wing 35a of the flattened shaft section 35 behind the respective finger or tooth 34 is shaped to fit into a corresponding pocket 40 formed in the respective dog 33 in advance of the respective tooth 34. This interfitting relation is indicated in FIG. 2 but is probably best seen in the enlarged sectional view of FIG. 6. Thus, especially when the parts are in the idle position of FIG. 6, should a sharp lateral blow be imparted to the solenoid casing 12 and its contained parts in the direction of the arrow 41 of FIG. 6, the fitting of the circumferential edges of the wings 35a of the flattened shaft section 35 into the indicated pockets 40 prevent rotary motion of the shaft 14 during engagement of adjacent wall portions 42 of the pockets 40 with adjacent wall portions 43 of the wings 35a. Otherwise rotary motion might develop due to inertial influences of the respective armatures 20 and 22, at least when the parts are in the position of FIG. 6.

Longitudinal or axial movement of the shaft 14 due to an axial blow also is prevented because the end faces of the fingers 34 engage against radial shoulders 44 formed in the shaft 14 when the latter is cut out to produce opposite recesses 45 forming the flat section 35 with its wings 35a. Thus, such shoulders 44 at the ends of the section 35 stop longitudinal movement of the fingers 34.

As indicated in FIG. 2, and better seen in FIG. 6, the fingers or teeth 34 when in de-energized positions rather closely approach the reduced or tapered adjacent ends of the opposing dogs 33, when the dogs 33 are separately formed. These parts assume corresponding positions when the fingers are integral as in the form of FIG. 7. Thus, operative space for the fingers 34 is provided.

When the parts are assembled as indicated in FIG. 1, the nonmagnetic front end bearing wall, which is shown in the form of a disc 46 (seen also in expanded relation in FIG. 4), is mounted about and receives the exposed outwardly projecting end of the rotary shaft 14, a hub 46a being provided to constitute an enlarged bearing which is received in an enlarged space in the ends of the assembled armatures 20 and 22 adjacent the outer end of the small axial bore 30. At the opposite end of the assembly of FIG. 1, there is provided a rear bearing disc 48, also of nonmagnetic material and having an enlarged hub 48a for the adjacent end of the rotary shaft 14, which, as previously indicated, also is of nonmagnetic material.

For the purpose of returning the shaft 14 and the associated movable parts to their restored or de-energized positions when the coil 10 is de-energized, the rear end of the shaft 14 is counter-bored at 50 and receives a coiled spring 52. The inner end of the spring 52 is affixed to a cross-pin 54 (FIG. 4) mounted crosswise in the inner end of the counter-bore 52. The outer end of the spring 52 is affixed as at 55 (FIG. 4) to a serrated cap plate 56 having appropriate teeth 56a to be received in corresponding serrations at the edges of a counter-bore 58 in the outer wall of the rear bearing plate 48. By this means, the cap 56 may be lifted from the counter-bore 58, as by an appropriate tool introduced into holes 59 in the cap 56, and the cap 56 rotated sufficiently to produce the required spring tension in the coil spring 52 for returning the shaft 14 and associated parts from their actuated positions as seen in FIGS. 3 and 8, to their restored or de-energized positions of FIGS. 2 and 6. As shown in FIGURE 9, an arm 60 may be attached to the shaft 14 for the purpose of transmitting the motion of shaft 14 to some other device.

In operation, when electric current is supplied to the coil 10 through its leads 11, which pass outward from the structure through a notch or other opening in the ring 16 and the rear bearing plate 48, the armatures 20 and 22 are energized to form north and south poles somewhat as indicated in the diagram of FIG. 9, with the result that opposed north poles at one end of the armatures (as indicated in FIG. 2) repel each other at one end and opposed south poles repel each other at the other end. This effect continues until about the position indicated in FIG. 7, whereupon attraction takes over by reason of, north poles of the armatures 20 and 22 being attracted by south pole portions of the respective frame rings 15 that are adjacent thereto as shown in FIG. 9, and cooperative attractive forces being likewise effective at the bottom of the structure between the south poles of the armatures 20 and 22 and adjacent north poles portions of the bottom frame ring 16. Under these attractive forces, the parts continue to the extreme position represented in FIGS. 3 and 8, in which relation they remain until de-energization of the coil 10. Upon breaking the circuit to the coil 10, the parts are de-energized and the coil spring 52 restores them to their original de-energized positions of FIGS. 2 and 6. To avoid residual magnetism and prevent the parts from sticking together, material, as between the armatures 20 and 22 and the edges of the frame rings 15 and 16. Also, parts may be plated to prevent corrosion.

Variations within the scope of the invention may be made by persons skilled in the art, and such are intended to be protected. For example, the shaft 35 may be of magnetic material rather than of non-magnetic material as above mentioned, together with other modifications.

The invention claimed is:

1. In a rotary solenoid construction:
    a magnetizing coil providing an axial opening;
    a magnetizable casing surrounding said coil;
    a pair of opposed arcuate armature members disposed within said coil about the axis thereof and movable toward and from said axis and toward and from each other;
    a rotary shaft disposed along said coil axis and between said armature members;
    engageable driven means formed on said shaft for rotary movement of the shaft; and
    drive means on said armature members engaging said driven means for rotary movement of the latter upon magnetic separation of said armature members under magnetizing influence of said coil.

2. A solenoid construction as in claim 1 wherein said armature members have engaging fingers projecting into recesses in said shaft and said shaft has inwardly extending walls engaged by said fingers for rotating said shaft.

3. A solenoid construction as in claim 1 wherein a portion of said shaft within said armature members is longtudinally recessed at opposite sides to provide longitudinally extending walls and transverse shoulders at the ends of said walls, and said armature members have fingers extending into said recesses and engaging said walls for rotation of said shaft by movement of said armature members.

4. A solenoid construction as in claim 3 wherein said fingers have ends engaging said shoulders preventing axial movement of said shaft with respect to said armature members.

5. A solenoid construction as in claim 3 wherein a flattened section of said shaft lies between said recesses and provides wing portions at the shaft circumference and said armaure members have pockets behind the respective fingers shaped to accommodate said wing portions in the de-energized positions of the parts and provide armature walls abutting said wing portions to check shaft rotation by inertial action of the armature members by a lateral blow on said casing.

6. A solenoid construction as in claim 1 including non-magnetizable end plates carried by the ends of said casing, said plates having bearings mounting said shaft.

7. A solenoid construction as in claim 6 wherein said bearing plates close said casing.

8. A solenoid construction as in claim 6 wherein said magnetizable casing has magnetizable end members, and said armatures are hinged to said magnetizable end members by non-magnetizable hinge members.

9. A rotary solenoid structure, including in combination:
    a cylindrical magnetizable casing having magnetizable end portions;
    a circular magnetizing coil concentrically disposed about an axis in said casing;
    a pair of opposed generally semi-cylindrical magnetizable armatures movable toward and from said axis and each other in said ocil;
    a rotary shaft axially disposed within said coil and armatures;
    engageable driven means formed on the shaft poriton within said armatures; and
    drive means on said armatures engaging said driven means on said shaft and effecting rotary motion of said shaft on energizing of said coil.

10. A solenoid structure as in claim 9 including non-magnetizable end plates mounted on the ends of said casing and carrying bearings mounting said shaft.

11. A solenoid structure as in claim 9 wherein said end portions of said casing are rings within which the ends of said armatures are disposed in movable relation, and said armatures are movably connected to said rings by non-magnetizable guide members.

12. A solenoid structure as in claim 9 wherein said armatures are provided with driving teeth constituting said drive means, and said driven means include walls of recesses cut in said shaft and receiving said teeth.

13. In a solenoid construction:
    a magnetizable casing providing a solenoid member;
    a pair of opposed armature members within said casing, both armature members being movable with respect to said solenoid member and with respect to each other;
    windings for magnetizing said solenoid member whereby opopsed parts of said armature members are similarly polarized so that such armature members move apart from each other;
    a rotary shaft disposed along the axis of said armature members and having engageable driven means thereon for rotary movement of the shaft; and
    drive means on said armature members for engaging said driven means upon magnetic separation of said armature members under magnetizing influence of said windings.

References Cited in the file of this patent
UNITED STATES PATENTS

| | | |
|---|---|---|
| 2,812,453 | Mastney | Nov. 5, 1957 |
| 2,866,109 | Watson | Dec. 23, 1958 |
| 2,989,871 | Straub | June 27, 1961 |